(12) United States Patent
Ashkenazi et al.

(10) Patent No.: US 10,546,080 B1
(45) Date of Patent: Jan. 28, 2020

(54) METHOD AND SYSTEM FOR IDENTIFYING POTENTIAL CAUSES OF FAILURE IN SIMULATION RUNS USING MACHINE LEARNING

(71) Applicant: Cadence Design Systems, Inc., San Jose, CA (US)

(72) Inventors: Yonatan Ashkenazi, Rehovot (IL); Nir Hadaya, Modi'in (IL); Tal Tabakman, Tel Aviv (IL); Nadav Chazan, Ness Ziona (IL); Yotam Gil, Tel Aviv (IL)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/233,590

(22) Filed: Dec. 27, 2018

(51) Int. Cl.
*G06F 17/50* (2006.01)
*G06N 20/00* (2019.01)
*G06F 11/26* (2006.01)

(52) U.S. Cl.
CPC ........ *G06F 17/5022* (2013.01); *G06F 11/261* (2013.01); *G06N 20/00* (2019.01); *G06F 2217/14* (2013.01); *G06F 2217/86* (2013.01)

(58) Field of Classification Search
None
See application file for complete search history.

*Primary Examiner* — Jack Chiang
*Assistant Examiner* — Aric Lin
(74) *Attorney, Agent, or Firm* — Pearl Cohen Zedek Latzer Baratz LLP

(57) ABSTRACT

A method for identifying a potential cause of a failure in simulation runs on a design under test (DUT) using machine learning is disclosed.

20 Claims, 4 Drawing Sheets

```
            'h0→ 'h1
            valid out ← #1 0;                        100
            'h0→ 'h7a                                 ↙
            parity out ← #1 0; ⌇102
            'h0→ 'h1
            chnl out ← #1 0;
            'h1→ 'h0
            ready ← #1 1;
end
else begin
        'h1 → 'h2
    case (state)
        'h1
        READY:
            begin
                'h1 → 'h0      'h0      'h1 → 'h0
                ready ← #1 ! (cha read | chb read);
                'h0 → 'h6ba834ad   'h0         'h0
                data out ← #1  cha read ==1? cha data :
104                          'h1 → 'h0     'h6ba834ad→  'h0
                                chb read ==1? chb data : 0;
                'h0 → 'h7a         'h0              'h0
                parity out ← #1  cha read ==1? cha parity :
                'h1 → 'h0      'h7a → 'h0
                   chb read ==1? chb parity : 0;
                'h0 → 'h1       'h0     'h1 → 'h0
                valid out ← #1  (cha read | chb read);
                'h0 → 'h1      'h1 → 'h0
                chnl out ← #1  chb read == 1 ? 1 : 0;
            end
        'h2
        BUSY :
            begin
                'h1 → 'h0
                ready ← #1 0;
106             'h0 → 'h6ba834ad
                 data out ← #1 0;
                'h0 → 'h7a
                parity out ← #1 0;
                'h0 → 'h1
```

Fig. 1A

// perform__checks                                    cdn_multi_pkg::cdn_multi_transfer@72 function void cdn_multi_slave_monitor::perform checks(cdn_multi_transfer tr) ;
        'h5a
  bit [7:0] expected parity;
  'h5a             N/A         worklib.cdn_regs_pkg::cdn_regs_cfg@3164_2
  expected parity = tr.calc parity)(cdn cfg);
        'h7a       'h5a
  if (tr.m parity != expected parity) begin
                  N/A
  'uvm error(get type name ( ), $psprintf("received transfer with Wrong Parity-%0s-@%0d expected:
  end
  endfunction : perform_checks

```
┌─────────────────────────────────────────────────────┐
│ Using a processor, analyze each of a plurality of   │
│ recorded failed simulation runs of verification     │
│ tests, starting from a suspected error,             │
│ constructing a tree of causes for that suspected    │
│ error, down to one or a plurality of points of      │
│ entry HDL signals                                   │
│                       202                           │
└─────────────────────────────────────────────────────┘
                          ▼
┌─────────────────────────────────────────────────────┐
│ Using a processor, based on driver tracing, and on  │
│ a tree of causes for each of said one or a          │
│ plurality of points of entry HDL signals, collect   │
│ signals that have contributed to a value of each of │
│ said one or a plurality of points of entry HDL      │
│ signals, at a time said one or a plurality of       │
│ points of entry HDL signals had affected the        │
│ suspected error                                     │
│                       204                           │
└─────────────────────────────────────────────────────┘
                          ▼
┌─────────────────────────────────────────────────────┐
│ Using a processor, analyze each of a plurality of   │
│ recorded successfully passed simulation runs of     │
│ verification tests, choosing randomly a value of    │
│ each of said one or a plurality of points of entry  │
│ HDL signals and based on driver tracing,            │
│ collecting signals that have contributed to said    │
│ value                                               │
│                       206                           │
└─────────────────────────────────────────────────────┘
                          ▼
┌─────────────────────────────────────────────────────┐
│       Extract features from said collected signals  │
│                       208                           │
└─────────────────────────────────────────────────────┘
                          ▼
┌─────────────────────────────────────────────────────┐
│ Train a machine learning algorithm to distinguish   │
│ between failed and successfully passed runs based   │
│ on the extracted features, and use results of the   │
│ training process to identify one or a plurality of  │
│ features of said extracted features that are        │
│ significant in predicting a failed run or a         │
│ successfully passed run                             │
│                       210                           │
└─────────────────────────────────────────────────────┘
                          ▼
┌─────────────────────────────────────────────────────┐
│ Using a processor, causing the identified one or a  │
│ plurality of features of said extracted features    │
│ that are significant in predicting a failed run or  │
│ a successfully passed run to be output on an output │
│ device                                              │
│                       212                           │
└─────────────────────────────────────────────────────┘
```

METHOD AND SYSTEM FOR IDENTIFYING POTENTIAL CAUSES OF FAILURE IN SIMULATION RUNS USING MACHINE LEARNING

FIELD OF THE INVENTION

The present invention relates to electronic design verification and more particularly to methods and systems identifying a potential cause for a failure in simulation runs on a design under test (DUT).

BACKGROUND OF THE INVENTION

Design verification is a common process for testing a newly designed integrated circuit, board or system-level architecture, to, for example, confirm that the integrated circuit, board or system-level architecture complies with the requirements defined by the specification of the architecture for that device. Design verification for a DUT may be performed on the actual device but can usually be a simulation model of the device that is tested.

Verification of electronic designs typically has three forms. At an early stage, before the electronic design is implemented in hardware, simulation can be conducted on a model of the design. Another form can be emulation, in which one electronic hardware is used to mimic the behavior of another (tested) electronic hardware. At more advanced stages of design development, a system on chip can be validated, in a process which is typically referred to as post-silicon verification. Post-silicon verification can be a last stage in the electronic design development, for example, before it is manufactured.

Current post-process debugging methods include a method which involves recording a specific program execution and allowing an on-line or off-line analysis of that execution. In this method, when recording the execution, typically all execution events that occurred during that execution are saved.

An "execution event" typically refers to any event that has occurred during the execution of the program, and may include, for example, a code line that was executed, a routine that was called, a parameter that was calculated, a variable that has been assigned a value, a status of a computing environment, an indication (e.g., text, line, or location within a source code representation or other representation of the software program being debugged, a function currently being executed, an instruction that called the function being currently executed, or other indication) of an instruction that is being executed or that was most recently executed, an address of a variable or instruction, an HDL signal being assigned a new value or other relevant information that may be displayed or otherwise made available to a user of the debugging tool, etc.

Information relating to the execution events encountered during an execution can be saved (e.g., into a database, memory, etc.), allowing the review of the recorded execution in a user interface while mimicking the look and feel of a regular debugging tool. Thus, the human user (hereinafter—user) can go back and forth (up to the last execution event that was recorded) and view various execution events of that specific execution, including the related information of these events. Using such a post-process debug method can allow the user to analyze any execution event and/or find the execution events that caused it to occur the way it did.

A post process debugger typically records information relating to a specific execution of a program under test and is designed to utilize that information so as to mimic a look and feel of a online debugger. Using the saved information, the post process debugger may show all the instances in which a given code line was executed, and what were the values of the variables, parameters and/or other fields found in a code line or in the scope of that code line for each instance. The post process debugger may also record all the messages that were printed while running the program and may have a specially designated graphical user interface (GUI) that presents these messages and allows filtering them in one or various ways.

SUMMARY OF THE INVENTION

There is thus provided, according to some embodiments of the present invention, a method for identifying a potential cause of a failure in simulation runs on a design under test (DUT). The method includes using a processor, analyzing each of a plurality of recorded failed simulation runs of verification tests, starting from a suspected error, constructing a tree of causes for that suspected error, down to one or a plurality of points of entry HDL signals. The method also includes using a processor, based on driver tracing, and on a tree of causes for each of said one or a plurality of points of entry HDL signals, collecting signals that have contributed to a value of each of said one or a plurality of points of entry HDL signals, at a time said one or a plurality of points of entry HDL signals had affected the suspected error. The method also includes using a processor, analyzing each of a plurality of recorded successfully passed simulation runs of verification tests, choosing randomly a value of each of said one or a plurality of points of entry HDL signals and based on driver tracing and on a tree of causes, collecting signals that have contributed to said value. The method also includes using a processor, extracting features from said collected signals, training a machine learning algorithm to distinguish between failed and successfully passed runs based on the extracted features, using results of the training process to identify one or a plurality of features of said extracted features that are significant in predicting a failed run or a successfully passed run, and causing the identified one or a plurality of features of said extracted features that are significant in predicting a failed run or a successfully passed run to be output on an output device.

In some embodiments of the invention, the suspected error is indicated by an error message.

In some embodiments of the invention, the output device is a display device.

In some embodiments of the invention, the features are selected from the group consisting of values of single bit signals, entire bus values, separate bits of bus values and driver source code line numbers.

In some embodiments of the invention, zero or a predetermined value are excluded from the randomly chosen value of each of said one or a plurality of points of entry HDL signals.

In some embodiments of the invention, a depth of the driver tracing is defined by a user.

In some embodiments of the invention, the method further includes validating the applied machine learning on a set of withheld successfully passed or failed recorded simulation runs.

In some embodiments of the invention, causing the identified one or a plurality of features of said extracted features that were found significant in predicting a failed run or a successfully passed run to be output on an output device is performed only if said one or a plurality of features of said extracted features that are significant in predicting a failed run or a successfully passed runs were validated on the set of withheld passed or failed recorded simulation runs.

In some embodiments of the invention, there is also provided a system for identifying a potential cause for a failure in simulation runs on a design under test (DUT). The system includes a memory and a processor configured to analyze each of a plurality of recorded failed simulation runs of verification tests, starting from a suspected error, constructing a tree of causes for that suspected error, down to one or a plurality of points of entry HDL signals; based on driver tracing, and on a tree of causes for each of said one or a plurality of points of entry HDL signals, to collect signals that have contributed to a value of each of said one or a plurality of points of entry HDL signals, at a time said one or a plurality of points of entry HDL signals had affected the suspected error, to analyze each of a plurality of recorded successfully passed simulation runs of verification tests, choosing randomly a value of each of said one or a plurality of points of entry HDL signals and based on driver tracing, collect signals that have contributed to said value; to extract features from said collected signals; to train a machine learning algorithm to distinguish between failed and successfully passed runs based on the extracted features, and use results of the training process to identify one or a plurality of features of said extracted features that are significant in predicting a failed run or a successfully passed run; and to cause the identified one or a plurality of features of said extracted features that are significant in predicting a failed run or a successfully passed run to be output on an output device.

BRIEF DESCRIPTION OF THE DRAWINGS

In order for the present invention to be better understood and its practical applications better appreciated, the following figures are provided and referenced hereafter. It should be noted that the figures are given as examples only and in no way limit the scope of the invention. Like components are denoted by like reference numerals.

FIG. 1A shows a screenshot of a scope of a post-process debugger, according to some embodiments of the present invention, presenting code of a failed simulation run of a validation test on a DUT.

FIG. 1B shows a screenshot of a scope of a post-process debugger, according to some embodiments of the present invention, presenting code 100 of a failed simulation run of a validation test, showing an error message.

FIG. 2 is a diagram of a method for identifying a potential cause of a failure in simulation runs on a DUT, according to some embodiments of the present invention.

DETAILED DESCRIPTION OF EMBODIMENTS OF THE INVENTION

Figure 3:
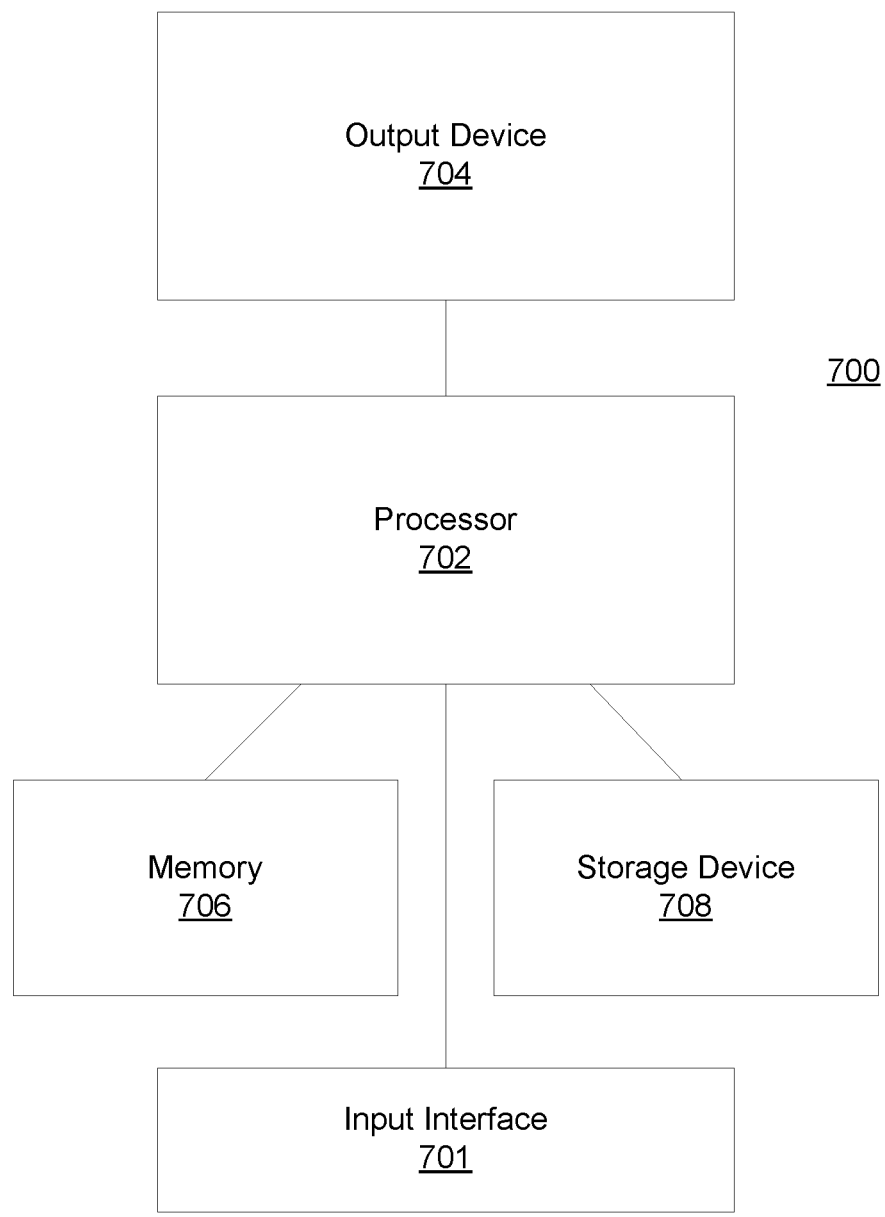
FIG. 3 is a system for reconstructing a graph representation of a previously executed verification test, according to some embodiments of the present invention.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

According to some embodiments of the present invention, there is provided a method for identifying a potential cause of a failure in simulation runs on a DUT During a verification process of a DUT, a large number of simulation runs are executed, of a plurality of verification tests, to test the DUT. A DUT is typically modeled and the DUT model is tested by inputting various inputs into the DUT and receiving outputs from the DUT by a testbench.

Typically, some of the simulation runs successfully pass, while others may fail.

Some embodiments of the present invention are aimed at employing machine learning techniques to learn to distinguish between failed runs (all of which included the same error. e.g., produced the same error message) and successfully passed runs. Once the learning process is complete, the features that are found significant in distinguishing between failed simulation runs and successfully passed runs may be presented to the user to help the user identify a bug causing the failure.

Some embodiments of the present invention seek to explore, for each of the failed runs of verification tests, trees of causes (sometimes also called cones of logic) trailing an error. In some embodiments of the invention, the trees of causes are traced back to an entry point, or a plurality of entry points that is known to be available also in successfully passed runs. while the error message and even the invocation of the method from which it was printed may not be available in the successfully passed runs, HDL signals that are found in the tree of causes are typically present in any run (because of the nature of HDL modeling), which makes them good candidates for investigation.

According to some embodiments of the invention, a tree of causes is constructed starting from each entry point to determine the contributors to that entry point, and these contributors are then further explored, so as to identify all the signals that affect the value of the point of entry signal at the time relevant for the error.

A post-process debugger, according to some embodiments of the present invention, may be configured to allow a user, among other things, to follow a cone of logic that caused a specific execution event that occurred during an execution of a verification test in simulation. Studying of cones of logic is sometimes referred to as "root cause analysis" and typically involves constructing a tree of causes that can be expanded and be searched as desired by the user.

The construction of the tree of causes in the testbench side is done in an accurate and certain way (but requires a lot of diskspace and recording time), whereas constructing tree of causes in the DUT side may have a measure of uncertainty (caused by the way the execution of the test is recorded) and exploring that part may involve referring to driver tracing, drivers and contributors. A driver is the line of code which caused a signal to be assigned its value (there can be more than one such line for a given signal) and contributors are the signals that effected that value (typically appear in the right hand side of that line of code) or signals that caused the logic path to access that line of code (for example if the line of code is in a case statement the signal on which the case operates is a contributor). (See FIG. 1 and related description hereinafter.)

According to some embodiments, when provided with a failed execution of a test (recorded), the post-process debugger may determine the direct causes for that failure (typically the failure is indicated by an error message). The post-process debugger may determine the causes of each of the determined direct causes, and this iterative process can go on searching back into the earlier causes, up to a user-desired or predetermined level of hierarchy (depth) and construct a tree of causes for a particular error—that includes the causes that contribute in some way to the error. According to some embodiments of the invention, the post process debugger may bridge the gap between the testbench side of the test code and the DUT, HDL code—so, in case a value in the testbench was driven by a signal in the DUT, it may be identified as a DUT signal that is a cause of the testbench value.

According to some embodiments of the present invention, a post-process debugger may start exploring a failed execution of the test from an error message (e.g., DUT_error/UVM_error) in the testbench side of the test's code and identify the HDL signals in the DUT that have contributed in some way to that error. The post-process debugger, according to some embodiments, may also show the logical path in which these HDL signals caused the error to occur. The identified HDL signals identified in this process may be used later in exploring successfully passed runs. Hereinafter, the HDL signals that cross over from the DUT side to the testbench side in the code are referred to as "entry point signals".

According to some embodiments of the present invention, the post-process debugger may perform driver tracing on the failed execution of the test to collect all the signals that contributed to the values of those "entry point signals" at the time these signals affected the error (note that there may be many values during the execution of the test, but the driver tracing typically focuses on the exact value that had affected the error) and collect these values as well. This process of driver tracing may be performed in steps, down to a predetermined level. In each driver tracing step, the post-process debugger may collect, for example, the line number of the driver (e.g., line number in the source code), the value of the driven signal and even the time that elapsed since the value of the signal has last changed, and then move on to perform the same action on all the contributing signals.

The post-process debugger may perform the above process for each failed run. In some embodiments of the invention, in order to increase the efficiency and reduce time, one failed execution of the test may be fully recorded, while in the other failed executions, only the relevant methods and HDL modules may be recorded.

According to some embodiments of the invention, for successful executions of the test, the post process debugger may obtain recorded HDL information (that is, only data relating to the DUT side of the execution of the test). In some embodiments of the invention, only those modules of the DUT that are traced through in the failed executions may be recorded and considered. The post-process debugger may, for each successful execution of the test, iteratively trace the drivers leading to randomly selected values of the entry point signals. According to some embodiments of the invention, the random selection may ignore specific non-interesting values (for example, for a 32 bit signal, the values "0" and "x" may generally be ignored, unless these values showed up in the failed executions of the test).

In some embodiments of the present invention, the post process debugger may, for each of the interesting values, perform driver tracing and collect all features from the contributing signals iteratively (collecting values and driver lines as in the failed executions).

According to some embodiments of the invention, the post-process debugger may extract various features of the signals that were collected in both the failed executions and the successful executions. These features may include, for example, values of single bit signals, entire bus values or bus values as separate bits (so each bit in the signal is treated as a feature on its own), the driver lines numbers of each signal and information about the time elapsed since the signal's value was last modified. The extracted features, along with a target pass or fail value, may then be subjected to a machine learning (ML) engine (e.g., algorithm) with the target being whether or not the test failed.

Some ML engines (e.g., RandomForest) are able, once trained, to indicate which features were the most significant features for their prediction (Some embodiments of the present invention may be implemented using such ML engines, while other embodiments may be implemented using other ML engines, more below). The final stage of the process, according to some embodiments of the invention, may include providing the extracted features and the target values and have an ML engine learn to predict if a test fails or passes based on the collected features and then determine which features substantially influence the prediction—the post-processor debugger may cause these features to be displayed to the user on a display, for example, with the path in which they have affected the error.

For example, in some embodiments of the invention, bits of the signals may be selected as features. An ML engine, such as, for example, RandomForest, may be used to learn how to predict if a certain execution of a test is likely to successfully pass or fail. ML engines, such as RandomForest, may include a capability called "feature importance" that is configured to identify and indicate bits were substantially influential in determining that that execution is likely to successfully pass or fail.

In some embodiments of the invention, other machine learning algorithms may be used. In such cases, determining which features substantially influence the prediction may be done by performing the following steps for a predetermined number of times: (1) choosing a random set of the extracted features; (2) choosing a test set and training set out of the successful and failed executions; (3) apply machine learning using the training set and the random set of features; (4) predicting the results of the test set and scoring how well the prediction has been; (5) adding the score to each of the features that were randomly selected in this phase. And then:

dividing the score of each feature by the number of times it was randomly selected to get the grade of that feature; and indicating the features with the highest grades as the most important features that affect the success or failure of an execution of the test.

The same process (only simpler) can be performed, in some embodiments, when the error is a result of a System Verilog assertion—where in such cases the process may start from the error inside the DUT and can skip the root cause analysis in the test bench side, which may effectively simplify and shorten the time it takes to complete this process.

It should be noted that, in some embodiments of the present invention, there may be different signals collected in different executions of a test, and a way to determine how to handle them may be predetermined or defined by the user. In some embodiments, common signals in the majority of the failed executions may be used in the process.

FIG. 1A shows a screenshot of a scope of a post-process debugger, according to some embodiments of the present invention, presenting code 100 of a failed simulation run of a verification test.

Shown in this figure are three drivers for the signal "parity_out" as defined in three lines in which that signal is assigned with a value—lines 86 (102), 97 (104) and 106 (106).

The signals that contribute to the value of parity_out of line 97 appear on the right hand side of the expression in line 97, and are the "contributors" to parity_out. These are: "cha_read", "cha_parity", "chb_read" and "chb_parity". But there are more contributors that contribute to making sure that this line is executed and those are the signal "state" (line 91), and the signals "reset" and "clock" (not shown in the scope shown in this figure).

FIG. 1B shows a screenshot of a scope of a post-process debugger, according to some embodiments of the present invention, presenting code 100 of a failed simulation run of a validation test, showing an error message 108—"uvm error". A method for identifying a potential cause for a failure in simulation runs on a design under test (DUT), according to some embodiments of the present invention, may start by identifying an error, e.g., identifying an error message, such as error message 108.

FIG. 2 is a diagram of a method 200 for identifying a potential cause of a failure in simulation runs on a DUT, according to some embodiments of the present invention.

Method 200 may include, using a processor, analyzing 202 each of a plurality of recorded failed simulation runs of verification tests, starting from a suspected error, constructing a tree of causes for that suspected error, down to one or a plurality of points of entry HDL signals Method 200 may also include, using a processor, based on driver tracing, and on a tree of causes for each of said one or a plurality of points of entry HDL signals, collecting 204 signals that have contributed to a value of each of said one or a plurality of points of entry HDL signals, at a time said one or a plurality of points of entry HDL signals had affected the suspected error.

Method 200 may also include, using a processor, analyzing 206 each of a plurality of recorded successfully passed simulation runs of verification tests, choosing randomly a value of each of said one or a plurality of points of entry HDL signals and, based on driver tracing, collecting signals that have contributed to said value.

Method 200 may also include extracting 208 features from said collected signals.

Method 200 may also include, using a processor, training 210 a machine learning algorithm to distinguish between failed and successfully passed runs based on the extracted features, using results of the training process to identify one or a plurality of features of said extracted features that are significant in predicting a failed run or a successfully passed run; and, using a processor, causing 212 the identified one or a plurality of features of said extracted features that are significant in predicting a failed run or a successfully passed run to be output on an output device.

In some embodiments of the invention, the suspected error is indicated by an error message.

In some embodiments of the invention, the output device is a display device.

In some embodiments of the invention, the features are selected from the group consisting of values of single bit signals, entire bus values, separate bits of bus values and driver source code line numbers.

In some embodiments of the invention, zero or a predetermined value are excluded from the randomly chosen value of each of said one or a plurality of points of entry HDL signals.

In some embodiments of the invention, a depth of the driver tracing is defined by a user.

In some embodiments of the invention, the method my also include validating the applied machine learning on a set of withheld successfully passed or failed recorded simulation runs.

In some embodiments of the invention, the step of causing the identified one or a plurality of features of said extracted features that were found significant in predicting a failed run or a successfully passed run to be output on an output device is performed only if said one or a plurality of features of said extracted features that are significant in predicting a failed run or a successfully passed runs were validated on the set of withheld passed or failed recorded simulation runs.

According to some embodiments of the invention, there may many ways to display the identified probable causes for the fault, for example:

(a) drawing a tree of causes starting from the error message and going back to each of the important features.

(b) showing the list of the important features and when the user selects one—displaying the causality root from the error to that feature.

(c) marking the path of each feature in some bold way in the debugger (for example marking the values of variables and signals in the paths to the features in red), thus allowing the user to trace along them as he please.

In some embodiments of the invention, another way of displaying the results is to create an optimized decision tree using only those most significant features—thus, trying to explain to the user how the combination of the features can affect the failure.

FIG. 3 is a system for identifying a potential fault in a verification test for testing a Design Under Test (DUT), according to some embodiments of the present invention. System 700 may include a processor 702 (e.g., single processor or a processing unit made that includes a plurality of processors, on a single machine or distributed on a plurality of machines) for executing a method according to some embodiments of the present invention. Processing unit 702 may be configured to perform a method according to some embodiments of the invention and perform other actions and processing according to some embodiments of the present invention.

Processor 702 may be linked with memory 706 on which a program implementing a method according to some embodiments of the present invention and corresponding data may be loaded and from which it may be run, and storage device 708, which includes a non-transitory computer readable medium (or mediums) such as, for example, one or a plurality of hard disks, flash memory devices, etc. on which a program implementing a method according to some embodiments of the present invention and corresponding data may be stored. System 700 may further include an output device 704 (e.g., display device such as CRT, LCD, LED etc.) on which one or a plurality user interfaces associated with a program implementing a method according to some embodiments of the present invention and corresponding data may be presented. System 700 may also include input interface 701, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that, when executed, cause a processor to execute method steps in accordance with examples. In some examples, the instructions stored on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A method for identifying a potential cause of a failure in simulation runs on a design under test (DUT), the method comprising:
   using a processor, analyzing each of a plurality of recorded failed simulation runs of verification tests, starting from a suspected error, constructing a tree of causes for that suspected error, down to one or a plurality of points of entry HDL signals;
   using a processor, based on driver tracing, and on a tree of causes for each of said one or a plurality of points of entry HDL signals, collecting signals that have contributed to a value of each of said one or a plurality of points of entry HDL signals, at a time said one or a plurality of points of entry HDL signals had affected the suspected error;
   using a processor, analyzing each of a plurality of recorded successfully passed simulation runs of verification tests, choosing randomly a value of each of said one or a plurality of points of entry HDL signals and based on driver tracing and on a tree of causes, collecting signals that have contributed to said value;
   using a processor, extracting features from said collected signals;
   using a processor, training a machine learning algorithm to distinguish between failed and successfully passed runs based on the extracted features and using results of the training process to identify one or a plurality of features of said extracted features that are significant in predicting a failed run or a successfully passed run;
   using a processor, causing the identified one or a plurality of features of said extracted features that are significant in predicting a failed run or a successfully passed run to be output on an output device.

2. The method of claim 1, wherein the suspected error is indicated by an error message.

3. The method of claim 1, wherein the output device is a display device.

4. The method of claim 1, wherein the features are selected from the group consisting of values of single bit signals, entire bus values, separate bits of bus values and driver source code line numbers.

5. The method of claim 4, wherein zero or a predetermined value are excluded from the randomly chosen value of each of said one or a plurality of points of entry HDL signals.

6. The method of claim 1, wherein a depth of the driver tracing is defined by a user.

7. The method of claim 1, further comprising validating the applied machine learning on a set of withheld successfully passed or failed recorded simulation runs.

8. The method of claim 7, wherein causing the identified one or a plurality of features of said extracted features that were found significant in predicting a failed run or a successfully passed run to be output on an output device is performed only if said one or a plurality of features of said extracted features that are significant in predicting a failed run or a successfully passed runs were validated on the set of withheld passed or failed recorded simulation runs.

9. A system for identifying a potential cause for a failure in simulation runs on a design under test (DUT), the system comprising:
   a memory, and
   a processor configured to:
      analyze each of a plurality of recorded failed simulation runs of verification tests, starting from a suspected error, constructing a tree of causes for that suspected error, down to one or a plurality of points of entry HDL signals;
      based on driver tracing and on a tree of causes for each of said one or a plurality of points of entry HDL signals, collect signals that have contributed to a value of each of said one or a plurality of points of entry HDL signals, at a time said one or a plurality of points of entry HDL signals had affected the suspected error;

analyze each of a plurality of recorded successfully passed simulation runs of verification tests, choosing randomly a value of each of said one or a plurality of points of entry HDL signals and, based on driver tracing and on a tree of causes, collect signals that have contributed to said value;

extract features from said collected signals;

train a machine learning algorithm to distinguish between failed and successfully passed runs based on the extracted features, and use results of the training process to identify one or a plurality of features of said extracted features that are significant in predicting a failed run or a successfully passed run; and cause the identified one or a plurality of features of said extracted features that are significant in predicting a failed run or a successfully passed run to be output on an output device.

10. The system of claim 9, wherein the suspected error is indicated by an error message.

11. The system of claim 9, wherein the output device is a display device.

12. The system of claim 9, wherein the features are selected from the group consisting of values of single bit signals, entire bus values, separate bits of bus values and driver source code line numbers.

13. The system of claim 12, wherein zero or a predetermined value are excluded from the randomly chosen value of each of said one or a plurality of points of entry HDL signals.

14. The system of claim 9, wherein a depth of the driver tracing is defined by a user.

15. The system of claim 9, wherein the processor is further configured to validate the applied machine learning on a set of withheld successfully passed or failed recorded simulation runs.

16. The system of claim 15, wherein the processor is configured to cause the identified one or a plurality of features of said extracted features that were found significant in predicting a failed run or a successfully passed run to be output on an output device only if said one or a plurality of features of said extracted features that are significant in predicting a failed run or a successfully passed runs were validated on the set of withheld passed or failed recorded simulation runs.

17. A non-transitory computer readable storage medium for identifying a potential cause for a failure in simulation runs on a design under test (DUT), having stored thereon instructions that when executed by a processor will cause the processor to:

analyze each of a plurality of recorded failed simulation runs of verification tests, starting from a suspected error, constructing a tree of causes for that suspected error, down to one or a plurality of points of entry HDL signals;

based on driver tracing and on a tree of causes for each of said one or a plurality of points of entry HDL signals, collect signals that have contributed to a value of each of said one or a plurality of points of entry HDL signals, at a time said one or a plurality of points of entry HDL signals had affected the suspected error;

analyze each of a plurality of recorded successfully passed simulation runs of verification tests, choosing randomly a value of each of said one or a plurality of points of entry HDL signals and, based on driver tracing and on a tree of causes, collect signals that have contributed to said value;

extract features from said collected signals;

train a machine learning algorithm to distinguish between failed and successfully passed runs based on the extracted features and use results of the training process to identify one or a plurality of features of said extracted features that are significant in predicting a failed run or a successfully passed run; and cause the identified one or a plurality of features of said extracted features that are significant in predicting a failed run or a successfully passed run to be output on an output device.

18. The non-transitory computer readable storage medium of claim 17, wherein the suspected error is indicated by an error message.

19. The non-transitory computer readable storage medium of claim 17, having stored thereon instructions that when executed by a processor will cause the processor to validate the applied machine learning on a set of withheld successfully passed or failed recorded simulation runs.

20. The non-transitory computer readable storage medium of claim 19, having stored thereon instructions that, when executed by a processor, will cause the processor to cause the identified one or a plurality of features of said extracted features that were found significant in predicting a failed run or a successfully passed run to be output on an output device to be performed only if said one or a plurality of features of said extracted features that are significant in predicting a failed run or a successfully passed runs were validated on the set of withheld passed or failed recorded simulation runs.

* * * * *